US010965463B2

(12) United States Patent
James

(10) Patent No.: US 10,965,463 B2
(45) Date of Patent: Mar. 30, 2021

(54) APPARATUSES, SYSTEM, AND METHODS FOR CONTROLLING AN ACTUATOR THROUGH A WIRELESS COMMUNICATIONS SYSTEM

(71) Applicant: SARONIKOS TRADING AND SERVICES, UNIPESSOAL LDA, Madeira (PT)

(72) Inventor: Robert James, Hatfield (GB)

(73) Assignee: Saronikos Trading and Services, Unipessoal LDA, Madeira (PT)

( * ) Notice: Subject to any disclaimer, the term of this patent is extended or adjusted under 35 U.S.C. 154(b) by 0 days.

(21) Appl. No.: 16/468,639

(22) PCT Filed: Dec. 15, 2016

(86) PCT No.: PCT/IB2016/057686
§ 371 (c)(1),
(2) Date: Jun. 11, 2019

(87) PCT Pub. No.: WO2018/109530
PCT Pub. Date: Jun. 21, 2018

(65) Prior Publication Data
US 2020/0099526 A1    Mar. 26, 2020

(51) Int. Cl.
*H04L 9/32* (2006.01)
*H04W 4/40* (2018.01)

(52) U.S. Cl.
CPC .......... *H04L 9/3226* (2013.01); *H04W 4/40* (2018.02)

(58) Field of Classification Search
CPC ... H04L 9/3226; H04L 9/3273; H04L 9/0662; H04W 4/40; G07C 9/00309

USPC ........................................................ 340/5.2
See application file for complete search history.

(56) References Cited

U.S. PATENT DOCUMENTS

| | | | |
|---|---|---|---|
| 5,420,925 A | 5/1995 | Michael | |
| 9,875,589 B1* | 1/2018 | Buttolo | ............ G07C 9/00174 |
| 2002/0002675 A1 | 1/2002 | Bush | |
| 2003/0120925 A1 | 6/2003 | Rose et al. | |
| 2006/0064587 A1 | 3/2006 | Braverman | |
| 2007/0067632 A1* | 3/2007 | Kaihori | ................. H04L 9/3273 |
| | | | 713/169 |
| 2009/0118896 A1* | 5/2009 | Gustafsson | ............ G05D 1/104 |
| | | | 701/31.4 |

(Continued)

OTHER PUBLICATIONS

International Search Report dated Sep. 11, 2017, issued in PCT Application No. PCT/IB2016/057686, filed Dec. 15, 2016.

*Primary Examiner* — Vernal U Brown
(74) *Attorney, Agent, or Firm* — Workman Nydegger

(57) ABSTRACT

A user apparatus, a base apparatus, and a method for authenticating these apparatuses through exchanging data packets is provided. The user apparatus and the base apparatus are paired, share a set of security algorithms and parameters, and perform a mutual authentication based on the challenge-response authentication mechanism. More in details, each of the challenge data packets includes authentication data (digest_a, digest_b, digest_c) and a set of at least two random sequences having random content and random length, wherein the random sequences are generated excluding those that, in the at least one data packet, produce at least one fake replica of the authentication data that at least one of the apparatuses can erroneously detect.

11 Claims, 4 Drawing Sheets

(56) References Cited

U.S. PATENT DOCUMENTS

2014/0169634 A1* 6/2014 Prakash ............... G06K 9/6201
                                                     382/105
2015/0071441 A1* 3/2015 Hinz ..................... H04L 9/0869
                                                     380/270

* cited by examiner a) Payload of the request data packet emitted by the User Apparatus b) Payload of the response data packet emitted by the Controlled Apparatus c) Payload of the confirmation data packet emitted by the User Apparatus d) Payload of the acknowledgment data packet emitted by the Controlled Apparatus

APPARATUSES, SYSTEM, AND METHODS FOR CONTROLLING AN ACTUATOR THROUGH A WIRELESS COMMUNICATIONS SYSTEM

BACKGROUND OF THE INVENTION

Field of the Invention

The invention relates to a user apparatus and a base apparatus for remote controlling an actuator through a communications system. Furthermore, the invention also relates to a method for authenticating these apparatuses through exchanging data packets.

Description of Prior Art

Many gates and garages are wirelessly controlled and many cars can be locked or unlocked and their ignitions started over radio waves from wireless keyfobs. In those control systems, the keyfob emits a signal comprising a digital code that the base apparatus knows. The base apparatus detects the wireless signals that are within its reception range and when it detects a signal that carries the digital code of the keyfob, it sends the appropriate command to activate the relevant actuator.

However, the signals emitted over the air by the keyfob can be eavesdropped and many tricks have been conceived to impersonate keyfobs. Attackers can record the radio signal emitted by the keyfob and use that recorded signal to open the doors, or try to recover secret codes.

Notwithstanding a number of countermeasures have been developed to improve protections against hacking, the wireless control systems still have vulnerabilities, even in the case of systems using the so called "rolling codes", by which the code of the digital key changes after every control command issued, according to a pseudorandom sequence to which the base apparatus is synchronized.

Since more and more people are using digital keys, there is a need to overcome the downsides of the current solutions and, in particular, to improve security.

SUMMARY OF THE INVENTION

The present invention aims to solve these and other problems by a user apparatus and a base apparatus for remote controlling an actuator with an improved level of security; in particular, these apparatuses are configured for executing a method for authenticating each other through exchanging data packets according to a challenge-response authentication mechanism.

According to a first general aspect of the present invention a user apparatus for remotely controlling an actuator in communication with a base apparatus is proposed, whereby the user apparatus comprises processing means configured to challenge said base apparatus by a first data packet comprising at least one identity data that identify said user apparatus and wherein said user apparatus is configured to emit said at least one identity data at different positions within said first data packet. Further said user apparatus is configured to position said identity data dependent on a positioning pattern, in particular dependent on a periodic, non-periodic or random pattern.

With regard to a further advantageous aspect of the present invention the user apparatus is configured to include in said first data packet at least one data sequence with a random content and/or with a random length.

In accordance with another advantageous aspect of the present invention the user apparatus is configured to emit fake replica of said at least one identity data.

In addition the user apparatus according to the present invention is configured to verify whether a randomly generated data sequence with a random content and/or with a random length comprises or produce in said first data packet a fake replica of said at least one identity data that said base apparatus can erroneously detect, and to exclude said randomly generated fake replica of being emitted.

In order to avoid repetition, it is clear that the aforementioned inventive and advantageous aspects and the technical features apply to the user apparatus, to the base apparatus, to a system and also to a corresponding method.

According to the present invention the user apparatus and the base apparatus perform mutual authentication by executing said authentication method that comprises at least the following phases:

- a packet generation phase, wherein at least one of the data packets is generated by means of processing means (which are preferably comprised in each apparatus), and comprises authentication data (e.g., identification data, message digests, or the like) and wherein said at least one authentication data is generated at different positions within said first data packet, wherein said different positions are dependent on a positioning pattern, in particular dependent on a periodic, non-periodic or random pattern. As an alternative additional aspect the at least one data packet may contain at least one data sequence with a random content and/or with a random length and/or a first timestamp having a fixed distance from said authentication data.
- an encryption phase, wherein said at least one data packet is encrypted by means of an encryption key (which is preferably contained in memory means comprised in each apparatus), in order to get an encrypted data packet;
- an emission phase, wherein said encrypted data packet is exchanged through communication means (which are preferably comprised in each apparatus) between said apparatuses.

In this way, it is possible to obscure the packet content, because the internal structure of the data can be recognized only if said authentication data are already known. This makes possible to operate a remote controlled actuator that enjoys a higher protection level than the solutions according to the prior art.

More in details, the data packet may comprise two random sequences with a random content and/or with a random length preferably placed at the beginning and the end of the data packet.

Furthermore, the data packet may also include a timestamp, which can be encoded with a secret timestamp encoding.

The system may also include a security management server, which is configured for assessing security risks, distributing security algorithms and keys, and revoking or changing the security elements when it is deemed appropriate. In other words, this security management server is configured for enforcing security policies defining which user apparatuses can activate a particular actuator.

When the user inputs a request (e.g., unlock the door), the user apparatus opens a control session for accomplishing that request, and emits a "request data packet" comprising at least the (secret) identification code of the user apparatus and two random sequences having random content and random length as said above. Moreover, the data packet may include a user request, if this is not implicit in the secret identification code, and a timestamp for improving the security. Then the user apparatus computes an expected digest of the request data packet with a secret digest algorithm, encrypts the data packet with a secret encryption algorithm by means of a secret encryption key, and emits the encrypted data packet over the air.

The base apparatus keeps receiving the signals that are picked-up by its antenna and decrypts them through said secret algorithm and a secret key, preferably the secret key used by the user apparatus. With any received and decrypted signal, the base apparatus searches for the secret identification code of the user apparatus and, when it finds that identification code out of the packet payload comprising the first two random sequences, it tries to detect the other information elements contained in that data packet, according to a predefined packet format.

Other advantageous features are illustrated in what follows and are the subject of the attached claims.

BRIEF DESCRIPTION OF THE DRAWINGS

The features of the invention are specifically set forth in the claims annexed to this description; such characteristics will be clearer from the following description of a preferred and non-exclusive embodiment that is shown in annexed drawings, wherein:

DETAILED DESCRIPTION OF THE INVENTION

In this description, any reference to "an embodiment" will indicate that a particular configuration, structure or feature, described in regard to the implementation of the invention, is comprised in at least one embodiment. Therefore, the phrase "in an embodiment" and other similar phrases, which may be present in different parts of this description, will not necessarily be all related to the same embodiment. Furthermore, any particular configuration, structure or feature may be combined in one or more embodiments in any way deemed appropriate. The references below are therefore used only for the sake of simplicity, and do not limit the protection scope or extension of the various embodiments.

Figure 1:
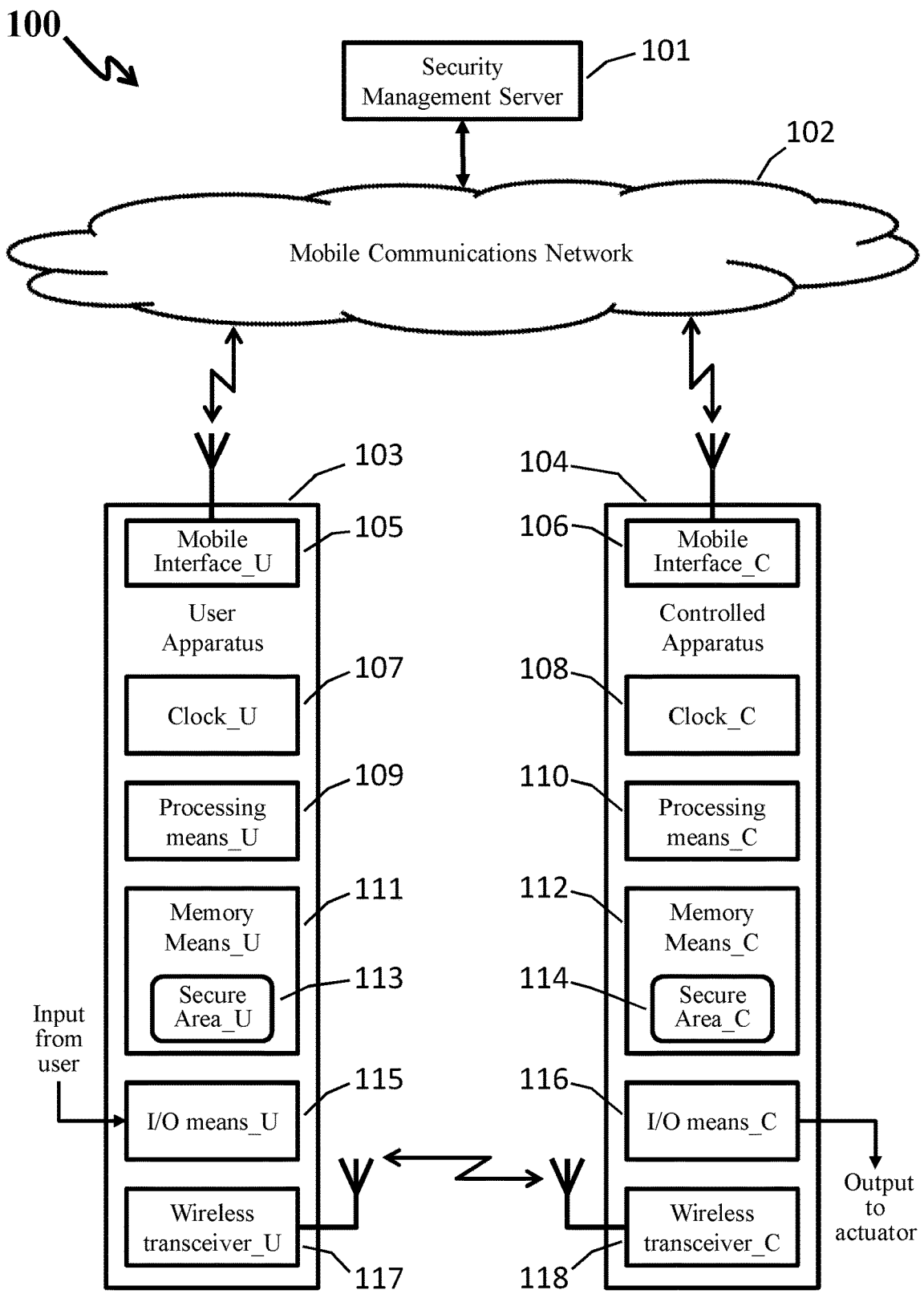
FIG. 1 shows a remote control system comprising apparatuses according to the present invention.

As depicted in the example shown in FIG. 1, the invention is based on a system 100 comprising two apparatuses, namely a user apparatus 103 and a base apparatus 104. Both apparatuses are paired and share secret security parameters each other, wherein said secret security parameters may comprise at least the identity of the user apparatus, an encryption algorithm, an encryption key, a timestamp algorithm, and a digest algorithm.

By means of wireless transceiver 117 and 118 respectively (also referred as 'communication means'), the user apparatus 103 and the base apparatus 104 can exchange data packets according to a challenge-response authentication mechanism through a bidirectional communications system, preferably a wireless communications system. This system may be a radio system, such as Wi-Fi, Bluetooth, NFC (Near-field communication), or an ad-hoc radio systems, or another type of radio system, but it may also be an infrared system, or a system using ultrasound waves, or a system using other types of transmission techniques suitable for providing bidirectional communications.

By means of mobile interfaces 105 and 106 respectively, the user apparatus 103 and the base apparatus 104 can communicate with a security management server 101, through a mobile communications network 102 for the management of security issues. The security management server receives operational data from user apparatus 103 and the base apparatus 104, assesses security risks, distributes security algorithms and parameters, and revokes or replace them when it is deemed appropriate (e.g., after a predetermined period of time, when a security issue arises, or the like). The security management server can be offered as a service by a certification authority or can be embodied as a private server.

Typically, the user apparatus 103 is a smartphone, a tablet, smart watch, or another kind of electronic device with an ad-hoc application loaded into its memory, i.e., a set of instruction implementing the phases of the method according to the present invention. Alternatively, the user apparatus 103 is embodied as a self-standing device, such as a keyfob or other forms of (embedded) device.

The base apparatus 104 is generally embodied in an ad-hoc device according to the kind of actuator that it has to control, but it can also be embodied as a general purpose controller device suitable for controlling a number of various actuator types.

In the preferred embodiment of the system, both the user apparatus 103 and the base apparatus 104 respectively comprise the following parts:

a mobile interface 105,106 for communicating with the management server 101;

a clock 107,108 for generating timing signals for other elements of the apparatuses, and generating timestamps;

processing means 109,110 for building data packets, encrypting and decrypting digital streams, searching for codewords in digital sequences, and for managing the procedures that are carried out according to the present invention, i.e., each of the processing means 109,110 is respectively configured for authenticating the other apparatus according to a challenge-response authentication mechanism;

memory means 111, 112 for storing general data and, preferably in a secure area 113, 114, secret data and algorithms;

input/output means 115 and 116 for receiving inputs from a user and outputting information (e.g., audio, visual, or textual messages for the user) and, in the case of the base apparatus, control signals for actuators;

communication means 117 and 118, preferably wireless transceiver with appropriate antennas, for emitting and receiving signals and carrying data packets.

More in details, the memory means 112 of the base apparatus 104 contains at least an encryption key and authorization information that defines which user apparatuses are allowed to activate said at least one actuator, whereas the memory means 111 of the user apparatus 103 contains a further encryption key. In case a symmetric encryption/decryption algorithm is used, the further encryption key can be the same of the key contained into the memory means 112 of the base apparatus 104; otherwise, the further encryption key can be different from the key used by the base apparatus 104 if an asymmetric encryption/decryption algorithm is adopted.

Figure 2:
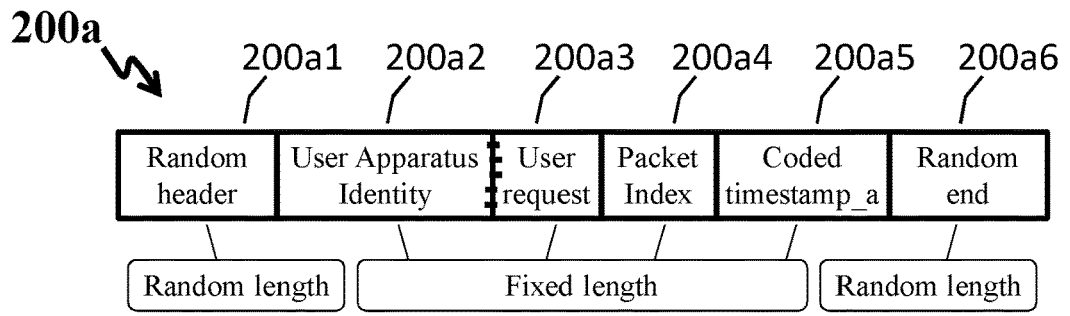
FIG. 2 shows exemplary formats of the payloads of the data packets that are exchanged between a user apparatus and a base apparatus according to the present invention.
Figure 2:
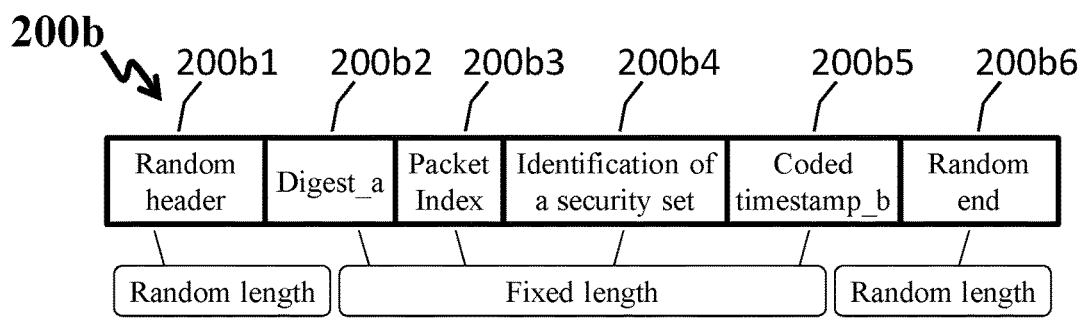
Figure 2:
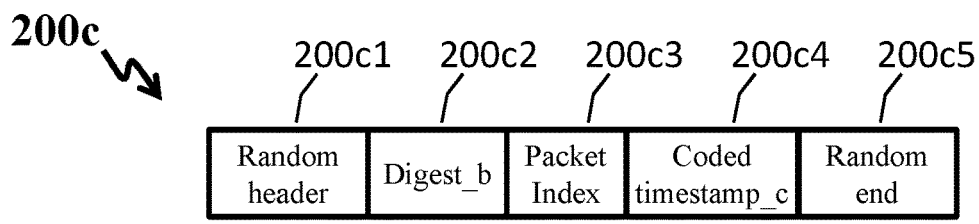
Figure 2:
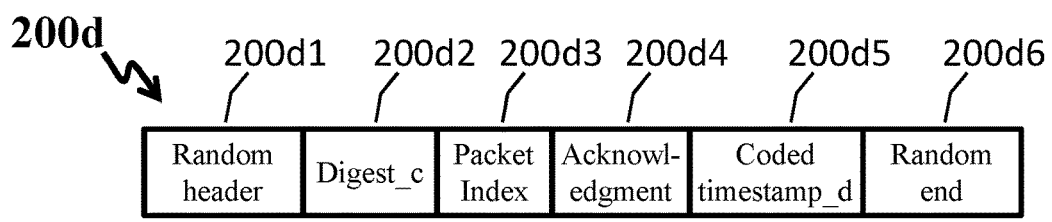

By means of their respective transceivers 117,118, the user apparatus 103 and the base apparatus 104 preferably emit or receive four types of data packets, that are now described also with reference to FIG. 2. For the sake of brevity, the packets headers and the packet trailers are not considered in what follows, as they are out the scope of the present invention and can be of a regular type that the skilled person knows. Therefore, any reference to the described packets and their format must be related to the packed payload only, even if it is not explicitly stated.

The payload of the request data packet 200a preferably comprises the identity 200a2 of the user apparatus, which has to be identified by the base apparatus, an encoded timestamp_a 200a5, and first set of two random sequences that preferably are placed at the beginning (random header 200a1) and the end (random end 200a6) of the packet. They have random content and random length and are produced by the processing means 109 according techniques well known to the skilled person. In the preferred embodiment of the invention, the length (also referred as 'LHa') of the random header 200a1 is a random number, ranging from zero to a maximum LaMax, and the length of the random end 200a6 is LEa=LaMax−LHa, so that the total length of the first two random sequences is the fixed value LaMax. If the other elements of the request data packet 200a have fixed length, the total length of the request data packet 200a is fixed. It will be clear, from the description that follows, that both the random header and the random end of the data packets can have independent random lengths, each limited between a their own minimum and maximum, however the skilled person understands that with data packets of fixed length the reception is simpler, while the randomness of the position of the identifier within the payload can be preserved by the complementary randomness of the two random sequences. Similarly, the total length of the two random sequences of the second packet 200b may be set to a fixed value LbMax, the total length of the two random sequences of the third packet 200b may be set to a fixed value LcMax, and total length of the two random sequences of the fourth packet 200d may be set to a fixed value LdMax. Some of the four values LaMax, LbMax, LcMax, and LdMax, or all of them, may be the same.

It evidenced that the skilled person may place said two random sequences in other positions of the packet (i.e., not necessarily at the beginning and at the end of the request data packet 200a), without departing from the teaching of the present invention.

FIG. 2 shows an exemplary format of a "request data packet" 200a that the user apparatus 103 emits at the beginning of a procedure for accomplishing a user request. That packet serves for conveying the needed information to the base apparatus and challenge the base apparatus for its authentication, as it will be better explained later on.

Due to the randomness content of the random header 200a1 and random end 200a6, it could happen that in the request data packet 103 can find more than one string corresponding to the identity 200a2 of the user apparatus; hence, some constraint has to be put on the random sequences. Considering that, in the preferred embodiment of the invention, the base apparatus will search for identification elements (the identity 200a2 of the user apparatus or, in other cases, as explained later, an expected digest) starting from the beginning of the request data packet 200a, one has to exclude those that comprise, or that create in combination with subsequent strings up to said identifier included, a string corresponding to the identity data 200a2 of the user apparatus that the base apparatus 104 will search for. Should other searching strategies be applied, the skilled person would be able to find the way to avoid fallacious detections of identifiers, without departing from the teachings of the present invention. As a general rule, said random sequences should be generated excluding those that, in the data packet where they are, they produce at least one fake replica of the identifier of the sending party that the receiving party can erroneously detect, taking into account the way used by the receiving party to search for the identifier.

The skilled person also understands that one could utilize a set of random sequences comprising more than two sequences without departing from the basic inventive idea, therefore in what follows any "set of two random sequences" must be considered as a "set of at least two random sequences" with the above characteristics, even if it is not explicitly stated.

If the user apparatus is configured for managing different kinds of user requests (e.g., "lock doors", "unlock doors", "open trunk", "disarm alarm", and others), in the preferred embodiment of the invention the request data packet 200a comprises a code 200a3 identifying the action requested. In FIG. 2 the border between the user apparatus identity 200a2 and the user request code 200a3 is dashed to indicate that, according to the present invention, the identity element 200a2 may also include the user request. In that case, the user apparatus 103 will have an identity code 200a2 for each type of user request that it can manage. This will increase the system security at the expense of an additional complexity. In fact, the base apparatus 104 will have to search, in the received data packets, for all the identity codes that the user apparatus manages (instead of searching just for the code 200a2 that identifies the user apparatus 103), and then detecting the user request code 200a3 that follows it.

FIG. 2 also shows an exemplary payload of a "response data packet" 200b that the base apparatus 104 emits when it detects a request data packet 200a.

In a similar way to the request data packet 200a, it comprises a second set of two random sequences, namely random header 200b1 and random end 200b6, with their own random content and random length. For them it applies what has been already said with regard to random header 200a1 and random end 200a6 respectively. The response data packet 200b differs from the request data packet 200a only for the presence of the field "digest_a" 200b2, in place of the user apparatus identity 200a2.

The "digest_a" 200b2 is the digest of the received data packet that the base apparatus 104 computes with said secret authentication algorithm used by the user apparatus 103 and that the user apparatus 103 expects to receive back to authenticate the base apparatus 104. The "digest_a" 200b2 also serves to identify the response data packet emitted by the base apparatus 104, and avoids sending the secret identity of the base apparatus 104, so that it reduces the possibilities to perform an attack against the system 100. Moreover, the response data packet 200b comprises an encoded timestamp_b 200b5, similar to the encoded timestamp_a.

The second two random sequences and digest_a 200b2 are the elements of the response data packet 200b. Besides them, in some embodiments of the invention, said response data packet 200b may also comprise an encoded timestamp_b 200b5 and/or a packet index 200b3 and/or an information field 200b4 for identifying a security set to be used for subsequent data packets. These elements will be better described in the following of this description.

FIG. 2 also shows an exemplary payload of a "confirmation data packet" 200c that the user apparatus 103 emits when it detects a response data packet 200b.

The confirmation data packet 200c is sent by the user apparatus 103 to confirm the user request 200a3 and allow the base apparatus 104 to authenticate the user apparatus 103.

The confirmation data packet 200c comprises the following elements: a third set of two random sequences having random content and random length, "digest_b", and (optionally) an encoded timestamp_c. The user apparatus 103 computes digest_b on the received response data packet 200b with a secret digest algorithm same as that used by the base apparatus 104 for computing a digest of its emitted response data packet 200b. Digest_b is expected by the base apparatus 104 to authenticate the user apparatus 103 and also serves to identify the user apparatus 103, thus avoiding the need to send the secret user apparatus identity 200a2 two times. This reduces the possibilities to perform an attack against the system 100.

FIG. 2 also shows an exemplary payload of an "acknowledgement data packet" 200d that, in some embodiments of the invention, the base apparatus 104 optionally emits when it detects a confirmation data packet 200c. This data packet is for acknowledging the completion of the action requested by the user. Digest_c serves also as identifier of the base apparatus 104.

It is evidenced that the data packet formats shown in FIG. 2 allows the user apparatus 103 and the base apparatus 104 to perform a mutual authentication. Furthermore, none of the data packets emitted over the air contains any identity of the base apparatus 104, whereas only the request data packet 200a contains the identity of the user apparatus 103 (in an encrypted format).

Figure 3:
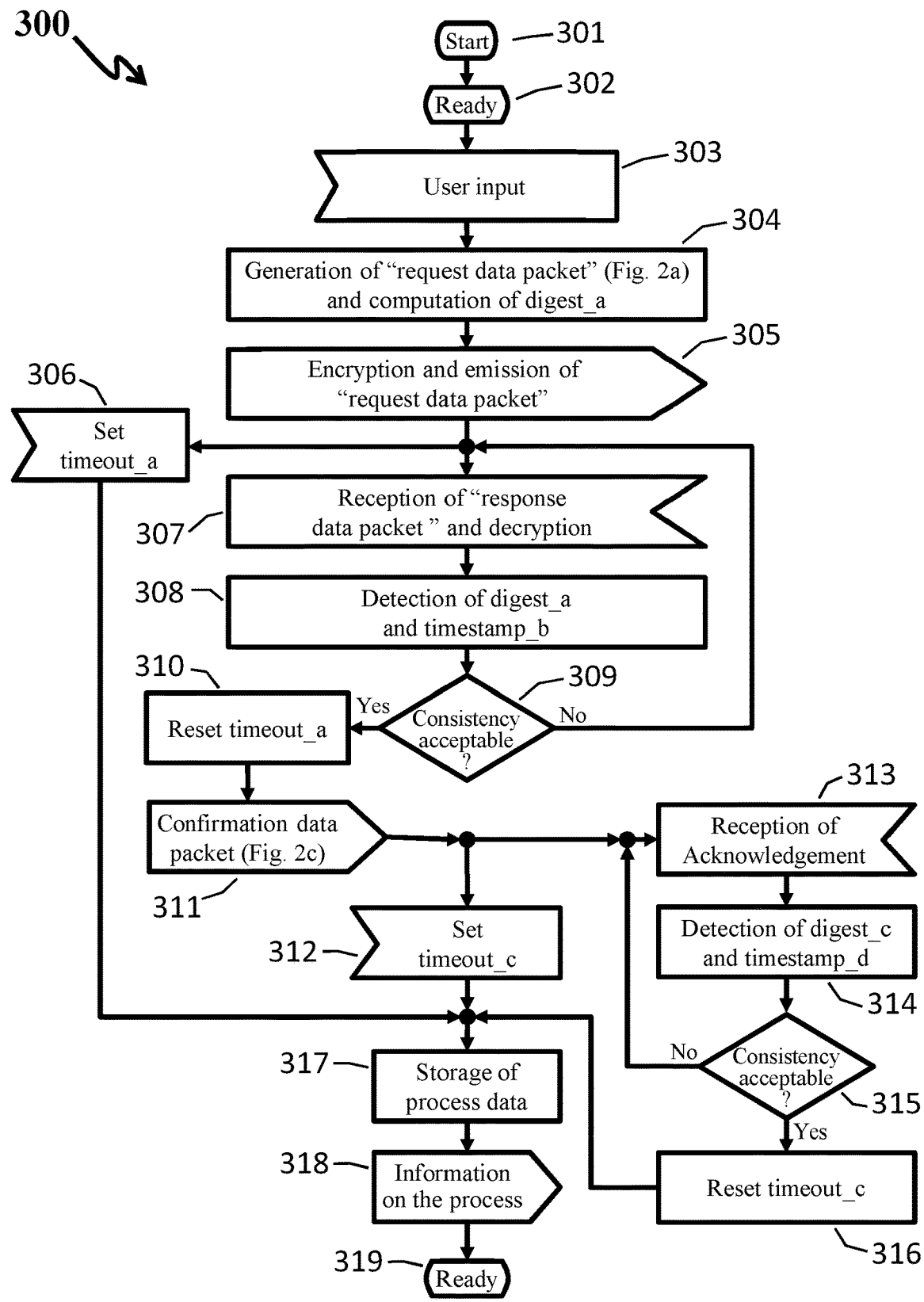
FIG. 3 shows a flow chart of the procedure performed by the user apparatus of FIG. 1.

With also reference to FIGS. 2 and 3, it will now be described the system 100 according to the present invention in an operation condition.

Figure 4:
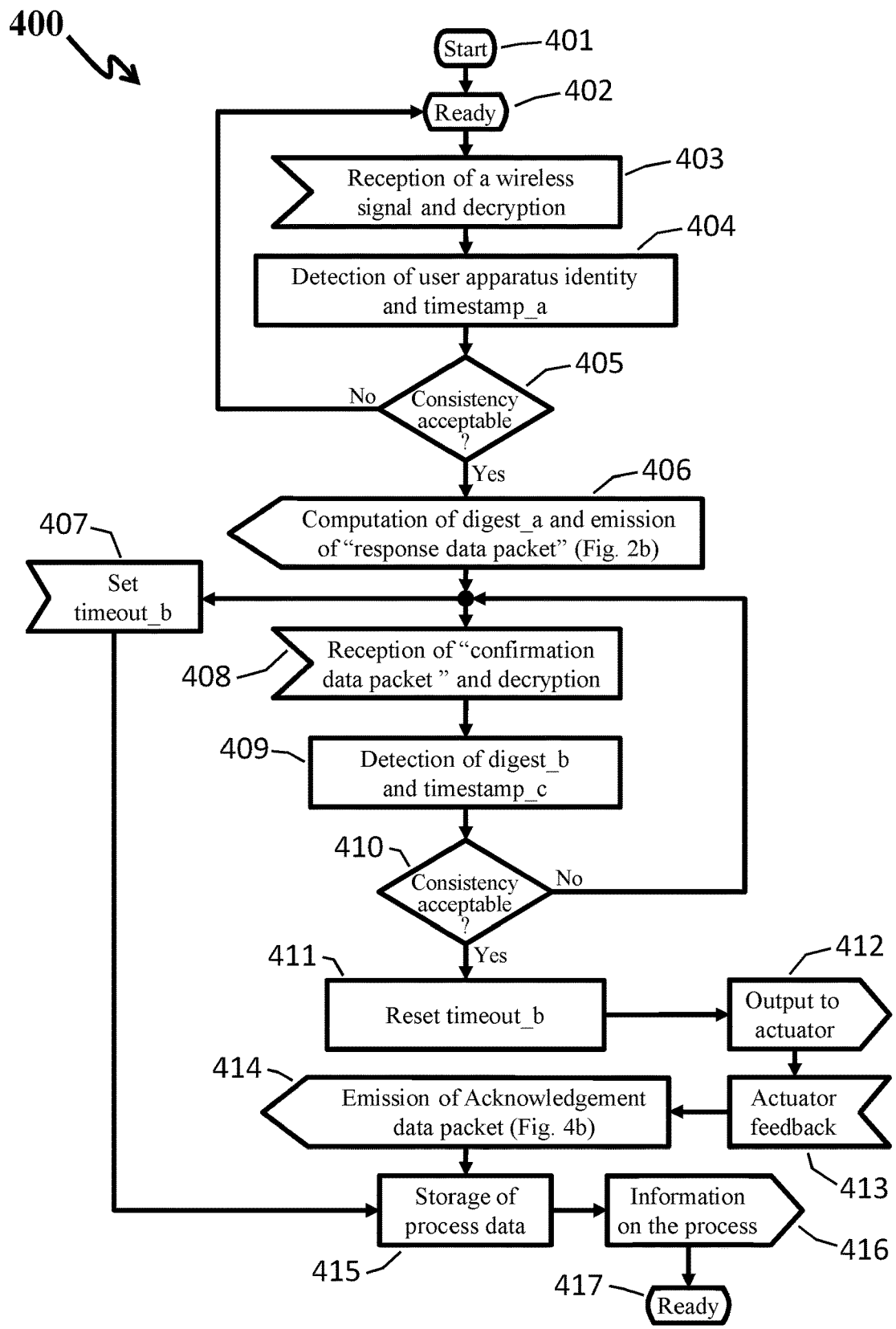
FIG. 4 shows a flow chart of the procedure performed by the base apparatus of FIG. 1.

The procedure carried out by the user apparatus 103, which is shown in the flow chart of FIG. 3, and the procedure carried out by the base apparatus 104, which is shown in the flow chart of FIG. 4, will be described below. Those two procedures are interlaced, so the resulting process goes forth and back between them.

For the sake of brevity, it must be assumed that all the data packets comprise a set of at least two random sequences generated according to the criteria and rules specified above, even if it is not explicitly stated.

After the starts 301 (FIG. 3) and 401 (FIG. 4) of the two procedures, the process resulting from their combination comprises the main phases listed below.

302—Ready state of the user apparatus 103 (FIG. 3) for receiving an input from its user.

402—Ready state of the base apparatus 104 (FIG. 4) for receiving a signal.

303—User input (FIG. 3): the user requests an action, typically by a push or a tap on a button or by a voice command or by means of other input techniques.

304—First packet generation: the user apparatus 103, by means of the processing means_U 109, generates a request data packet 200a (FIG. 2), which also serves as a challenge to the base apparatus 104, by means of the following steps:

generating a first set of two random sequences according to the rules and criteria specified above;

getting the user identity 200a2 from memory means 111;

getting (optionally) the current time marked by clock_U 107 and encoding it, with a timestamp algorithm, to obtain a coded timestamp_a 200a5;

getting a code of user request 200a3 if needed;

producing a packet index 200a4 if needed;

packing a data packet 200a comprising the above mentioned and other possible elements.

Then, by means of the processing means_U 109 and a digest algorithm, the user apparatus 103 computes an expected digest (digest_a) of that packet and stores it in the memory means_U 111. In the preferred embodiment of the invention, an expected digest_a is computed on the full payload of the packet; in other embodiments, the computation may be carried out on selected parts of the packet, e.g., on the sequence that is obtained by joining the "random header" and the "random end" of the data packet (FIG. 200a), or the like.

305—Emission of "request data packet": the user apparatus 103 encrypts and emits the request data packet 200a through its wireless transceiver 117 (FIG. 1); the encryption is carried out by the processing means_U 109, using said secret algorithm and said secret key, which are stored in the memory means_U 111.

306—Set timeout_a: the user apparatus 103 sets a timeout_a to stop waiting for a response when timeout_a expires; if timeout_a expires before a response is received, the process continues to phase 317.

403—Reception of a signal by the base apparatus (FIG. 4): the base apparatus 104 receives a signal carrying a data packet by means of its transceiver_C 118 and decrypts the received signal by the processing means_C 110, according to said encryption algorithm and encryption key, which are stored in the memory means 112.

404—Detection of user apparatus identity and timestamp_a: the base apparatus 104 searches for the user apparatus identity 200a2, that possibly the received data packet contains; if the search and detection is not successful, the process goes back to phase 403 and the base apparatus 104 keeps receiving the signals that are picked-up by its antenna. Otherwise, the base apparatus 104 optionally tries to extract the other information elements of the packet, and decodes an encoded timestamp_a received with the decrypted data packet by means of the processing means_C 110 and according to the timestamp algorithm stored in the memory means_C 112. Then the base apparatus 104 gets the current time marked by clock_C 108 and checks if this current time and the received timestamp are consistent. An example of consistency criterion is fulfilling the formula:

$$\text{DaMin} < \text{current timestamp} - \text{received timestamp} < \text{DaMax} \qquad (1)$$

where DaMin and DaMax are the minimum and the maximum delay allowed to the received signal respectively.

The base apparatus 104 evaluates, by means of its clock 108 and processing means_C 110, the difference between the time of arrival of the data packet (200a) and the received timestamp_a, and checks if said difference falls outside a numerical interval.

DaMin can take negative values to account for possible misalignments between the clock_U 107 of the user apparatus and the clock_C 108 of the base apparatus.

405—Determination on the timestamp_a consistency: if the difference computed in phase 404 is outside said numerical interval, the process goes back to the ready state 402, otherwise it is assumed that the user apparatus 103 has emitted the received packet and the process continues to phase 406.

406—Emission of "response data packet": by means of the processing means 110, the base apparatus 104 computes a response digest_a of the received data packet with rules and algorithms the same as those used by the user apparatus 103 for computing the expected digest_a (see phase [0056]) and, in a way similar to that described in phase 304, the base apparatus 104 generates a response data packet 200*b*, which also serves as a challenge to the user apparatus 103, comprising said response digest_a 200*b*2, which is also used as an identifier of the base apparatus 104, and a second set of two random sequences generated according the rules and criteria specified above. Optionally, the response data packet 200*b* may also comprise a timestamp_b that is obtained by encoding, preferably by means of a timestamp algorithm, the current time marked by clock_C 108.

Then the base apparatus 104 encrypts and emits the response data packet 200*b*, computes an expected digest_b of it, and stores the expected digest_b in the memory means_C 112.

407—Set timeout_b: the base apparatus 104 may set a timeout_b to stop waiting for a confirmation response when timeout_b expires; if timeout_b expires before a confirmation data packet 200_*c* is received, the process continues to phase 415.

307—Reception of response data packet by the user apparatus (FIG. 3): the user apparatus 103 receives a signal carrying a data packet 200*b* by means of its transceiver 117 and decrypts the received signal by the processing means 109, according to said encryption algorithm and encryption key, which are stored in the secure area_C 113.

308—Detection of digest_a and timestamp_b: the user apparatus 103 searches for digest_a, that possibly the received data packet contains; if the search is not successful, the process goes back to phase 307 and the user apparatus 103 keeps receiving signals. Otherwise, the user apparatus 103 tries to extract the other information elements of the packet and decodes an encoded timestamp_b received with the decrypted data packet by means of the processing means_U 109 and according to said timestamp algorithm stored in the secure area_C 113. Then, similarly to phase 404, the user apparatus 103 evaluates, by means of its clock 107 and processing means_U 109, the difference between the time of arrival of the data packet 200*b* and the received timestamp_b, and checks if said difference falls outside a numerical interval.

This numerical interval may be different for different data packets, since the apparatuses of the system may have different processing power, the opposite transmission links may have different characteristics, and different tolerances could be allowed with different data packets.

309—Determination on the timestamp_b consistency: if the difference computed in phase 308 is outside said numerical interval, the process goes back to phase 307, otherwise it is assumed that the received data packet has been emitted by the base apparatus 104, thus authenticating the base apparatus 104, and the process continues to phase 310.

310—Reset timeout_a: as the base apparatus (104) is authenticated, the user apparatus 103 resets timeout_a.

311—Emission of confirmation data packet: in a way similar to those described in phases 304 and 406, the user apparatus 103 computes a response digest_b of the received data packet that the base apparatus 104 expects and generates a confirmation data packet 200*c* comprising said response digest_b, which is also used as an identifier of the user apparatus 103 in place of user identity 200*a*2, a timestamp_c, obtained by encoding the current time marked by its clock_U 107, and a third set of two random sequences according to the rules and criteria specified above. Then the user apparatus 103 encrypts and emits the confirmation data packet to confirm that the user request sent with the request data packet 200*a* must be fulfilled. Finally, it computes an expected digest_c of the confirmation data packet and stores it in the memory means_U 111.

312—Timeout_c: the user apparatus 103 sets a timeout_c to stop waiting for an acknowledgement when timeout_c expires; if timeout_c expires before an acknowledgement data packet 200_*c* is received, the process continues to phase 317.

408—Reception of confirmation data packet (FIG. 4): in a way similar to that described in phase 403, the base apparatus 104 preferably receives and decrypts a signal by means of its transceiver 118 and processing means 110, respectively.

409—Detection of digest_b and timestamp_c: in a way similar to that described in phase 404, the base apparatus 104 searches for digest_b that possibly the received data packet contains. If the search is not successful, the process goes back to phase 408, otherwise the base apparatus 104 tries to extract the other information elements of the packet and decodes an encoded timestamp_c received with the decrypted data packet. Then the base apparatus 104 evaluates, by means of its clock 108 and processing means_C 110, the difference between the time of arrival of the data packet 200*c* and the received timestamp_c, and checks if said difference falls outside a numerical interval.

410—Determination on the timestamp_c consistency: if the difference computed in 409 is outside said numerical interval, the process goes back to phase 408, otherwise it is assumed that the received data packet has been emitted by the user apparatus 103, thus authenticating the user apparatus 103, and the process continues to phase 411.

411—Reset of timeout_b: in this phase, the user apparatus 103 is considered authenticated, so the base apparatus 104 resets timeout_b, and the process continues to phase 412.

412—Output to actuator: the base apparatus 104, by means of I/O means_C 116, sends an appropriate signal to the relevant actuator for fulfilling the user request.

413—Actuator feedback: the base apparatus 104 preferably receives a feedback from the relevant actuator about the completion of the user request.

414—Emission of acknowledgement data packet: in a way similar to that described in phase 406, the base apparatus 104 computes a response digest_c of the received data packet and generates an acknowledgement data packet 200*d* comprising a response digest_c, which is also used as an identifier of the base apparatus 104, and a fourth set of two random sequences according the rules and criteria specified above. Optionally, the acknowledgement data packet 200*d* may also comprise a timestamp d obtained by encoding the current time marked by its clock_C 108. Then the base apparatus 104 encrypts and emits the acknowledgement data packet to give positive or negative acknowledgement on the completion of the user request.

The emission of the acknowledgement data packet 200*d* is optional. However, it can be useful for the user to receive a feedback on the execution of a command (e.g., "close doors"), which has to be properly completed in order to ensure the security of a particular area (e.g., a garage, a house, an office, or the like).

415—Storage of process data: the base apparatus 104 stores the data relevant to the process carried out, in order to allow analysis and identification of attack attempts and evaluate risks.

416—Information on the process: the base apparatus 104 outputs information on the process through its input/output means 116 (FIG. 1).

417—Ready state for the base apparatus 104.

313—Reception of acknowledgement data packet by the user apparatus (FIG. 3): in a way similar to that described in phase 307, the user apparatus 103 receives and decrypts a wireless signal by means of its wireless transceiver 117 and processing means 109.

314—Detection of digest_c and timestamp_d: in a way similar to that described in phase 308, the user apparatus 103 searches for digest_c that possibly the received data packet contains. If the search is not successful, the process goes back to phase 313, otherwise the user apparatus 103 tries to extract the other information elements of the packet and decodes an encoded timestamp_d received with the decrypted data packet. Then the user apparatus 103 optionally evaluates, by means of its clock_U 107 and processing means_C 109, the difference between the time of arrival of the data packet 200*d* and the received timestamp_d, and checks if said difference falls outside a numerical interval.

315—Determination on the timestamp_d consistency: if the difference computed in phase 314 is outside said numerical interval, the process goes back to phase 313, otherwise it is assumed that the received data packet has been emitted by the base apparatus 104 and the process continues to phase 316.

316—Reset of timeout_c: after the determination that the received data packet has been emitted by the base apparatus 104, the user apparatus 103 resets timeout_c.

317—Storage of process data: the user apparatus 103 stores the data relevant to the process for allowing analysis and identification of attack attempts and evaluation of risks.

318—Information on the process: the user apparatus 103 outputs information about the process (e.g., logging information, notification messages, or the like) though its input/output means 115 (FIG. 1).

319—Ready state for the user apparatus 103.

In this way, the security level of the system 100 results further increased.

As already mentioned before, each of the apparatuses 103,104 is configured for executing the authentication method according to the invention. This method comprises the following phases:

- a packet generation phase, wherein at least one of said data packets 200*a*-200*d* is generated by means of processing means 109,110, and comprises authentication data (i.e., identification data 200*a*2 and/or digests 200*b*2,200*c*2,200*d*2) and a set of at least two random sequences having random content and random length, wherein said random sequences are generated excluding those that, in said at least one data packet 200*a*-200*d*, produce at least one fake replica of said authentication data that at least one of said apparatuses 103,104 can erroneously detect;
- an encryption phase, wherein said at least one data packet 200*a*-200*d* is encrypted by means of an encryption key, in order to get an encrypted data packet;
- an emission phase, wherein said encrypted data packet is exchanged through communication means 117,118 between said apparatuses 103,104.

Randomizing the position of apparatus identifiers by means of random sequences with random length, in combination with the optional timestamps and timeouts, significantly increases security against hacking/cracking attacks even in cases they are of "brute force" or "reuse of captured signals" or "man in the middle" type.

In the preferred embodiment of the invention, in addition to what is specified above, the user apparatus 103 and the base apparatus 104 can communicate with a security management server 101 (FIG. 1), which is comprised in the system 100, through a mobile communications network 102, by means of mobile interfaces 105 and 106 respectively. They send, to the security server 101, information and data on the processes carried out, preferably including localization data if they are equipped with localization means, and, from the server, they receive updates of security parameters; more in details; the security management server 101 is configured for enforcing security policies defining at least which user apparatuses can activate a particular actuator.

With the received data, the security management server 101 assesses hacking risks and takes suitable actions to counteract them. This significantly improves the security of the system of the present invention.

In particular, the processing means 109 of the user apparatus 103 may also be configured for transmitting to the security management server 101 one or more of the following information:

- a control request specifying which actuator the user wants to control and the current identity data of said user apparatus 103;
- information on the outcome of actions requested by the user;
- information received from the base apparatus 104;
- information on received anomalous data packets that could be relevant to detect security threats (e.g., a list of failed authentication attempts or the like).

On the other hand, the processing means 109 of the user apparatus 103 may also be configured for receiving, through said communication interface 105, an encryption key for communicating with the base apparatus 104 in a secure way, in order to control said actuator.

Similarly, the processing means 110 of the base apparatus 104 may also be configured for receiving from the security management server 101, through said communication interface 106, identity data that identify said user apparatus 103 and at least one encryption key for communicating with said user apparatus 103 in a secure way, in order to allow the (secure) control of the actuator.

On the other hand, the processing means 110 of the base apparatus 104 may also be configured for transmitting to the security management server 101, through said mobile interface 106, information on actions carried out by the actuator and on received anomalous data packets 200*a*,200*c* that could be relevant to detect security threats.

On the other side, the security management server 101 may be configured for performing the following actions:

- receiving said control request from the user apparatus 103;
- determining whether said user apparatus 103 can activate said actuator on the basis of the identity data and the security policies;
- transmitting said encryption key and said identity data identifying said user apparatus 103 to both said user apparatus 103 and base apparatus 104 if said user apparatus 103 is allowed to activate said actuator.

Alternatively or in combination with the above-described features, the security management server 101 may be also configured for performing the following actions:

- receiving data relevant to security from the base apparatus 104;
- sending to said base apparatus 104 authorization information that defines which user apparatuses are allowed to activate said at least one actuator, wherein said base apparatus 104 is configured for activating said at least one actuator by said input/output means (116) if the identification data received in the first data packet 200*a* are contained in said authorization information.

In this way, the security level of the system 100 results further increased.

In a variant of the preferred embodiment, the data packets comprise a packet index for allowing apparatuses to check consistency of the received data packets with respect to the current control session and sequence of control sessions, as the skilled person knows.

In another embodiment of the invention, the security elements (algorithms, keys, parameters) may change at every new session or even within a session. An example of such a change is envisaged in the packet format 200*b* (FIG. 2), wherein the information element 200*b*4 carries the identification of a security set to be used from the next data packet or from the next control session.

The method according to the invention can be implemented as a software application that can be installed in portable devices (which can be commonly carried on the move), so that the user can advantageously reduce the number of devices to carry in their pockets or purses.

The present description has tackled some of the possible variants, but it will be apparent to the person skilled in the art that other embodiments may also be implemented, wherein some elements may be replaced with other technically equivalent elements. The present invention is not therefore limited to the explanatory examples described herein, but may be subject to many modifications, improvements or replacements of equivalent parts and elements without departing from the basic inventive idea, as set out in the following claims.

The invention claimed is:

1. A user apparatus for remotely controlling an actuator in communication with a base apparatus, comprising:
   communication means for communicating with said base apparatus;
   memory means containing at least an encryption key; and
   processing means in communication with said memory means and said communication means, and configured for authenticating said base apparatus according to a challenge-response authentication mechanism;
   wherein the processing means are configured for challenging said base apparatus by a first data packet, which is encrypted through said encryption key and then emitted through said communication means, and wherein said first data packet comprises at least one identity data that identify said user apparatus, and wherein said user apparatus is configured to emit said at least one identity data at different positions within said first data packet, wherein said different positions are dependent on a positioning pattern, in particular dependent on a periodic, non-periodic or random pattern;
   wherein:
      that said user apparatus is configured to include in said first data packet at least one data sequence with a random content and/or with a random length; and/or
      that said user apparatus is configured to emit fake replica of said at least one identity data; and/or
      that said user apparatus is configured to verify whether a randomly generated data sequence with a random content and/or with a random length comprises or produce in said first data packet a fake replica of said at least one identity data that said base apparatus can erroneously detect, and to exclude said randomly generated fake replica of being emitted; and/or
   wherein the processing means are also configured for:
      generating an expected first digest on the basis of said first data packet;
      receiving, through the communication means, an encrypted second data packet, which can be generated from the base apparatus in response to the first data packet;
      decrypting an encrypted second data packet by means of said encryption key, in order to get the second data packet comprising at least a received first digest (digest_a) and a second set of at least two random sequences having random content and random length, wherein said random sequences are generated excluding those that, in said second data packet, produce at least one fake replica of said received first digest (digest_a) that said user apparatus can erroneously detect;
      searching for said expected first digest in said second data packet;
      generating a third data packet in response to said second data packet if said second data packet contains said expected first digest, wherein said third data packet comprises at least:
         a response second digest (digest_b) generated on the basis of said second data packet; and
         a third set of at least two random sequences having random content and random length, wherein said random sequences are generated excluding those that, in said third data packet, produce at least one fake replica of said response second digest (digest_b) that said base apparatus can erroneously detect;
      encrypting said third data packet by means of said encryption key, in order to get an encrypted third data packet;
      emitting, through the communication means, the encrypted third data packet, so that said base apparatus can receive said encrypted third data packet, and determine if said actuator has to be activated on the basis of said identity data and said response second digest (digest_b) and/or
   wherein said user apparatus comprising a clock, wherein said processing means are also configured for generating, by means of said clock, a first timestamp (timestamp_a) and a third timestamp (timestamp_c), and wherein said first data packet also comprises said first timestamp (timestamp_a) positioned at a first fixed distance from said identity data, and said third data packet also comprises said third timestamp (timestamp_c) positioned at a third fixed distance from said response second digest (digest_b).

2. The user apparatus according to claim 1, wherein the second data packet also comprises a second timestamp (timestamp_b), and wherein the processing means are also configured for:
   evaluating, by means of said clock and said processing means, the difference between the time of arrival of said second data packet and said second timestamp (timestamp_b); and
   stopping the emission of said third data packet if said difference falls outside a numerical interval.

3. The user apparatus according to claim 1, comprising input/output means for outputting the result of attempting to activate said actuator, wherein the processing means are also configured for:

generating an expected second digest on the basis of said third data packets receiving, through the communication means, an encrypted fourth data packet from the base apparatus;

decrypting said encrypted fourth data packet by means of said encryption key, in order to get a fourth data packet comprising a response second third digest (digest_c) and a fourth set of two random sequences having random content and random length, wherein said random sequences are generated excluding those that, in said fourth data packet, produce at least one fake replica of said response second third digest (digest_c) that said user apparatus can erroneously detects;

confirming, through the input/output means, the successful activation of the actuator only if the expected second digest and the response second third digest (digest_c) are the same.

4. The user apparatus according to claim 3, wherein the processing means are also configured for:

transmitting, by means of said communication interface, information carried by said fourth data packet.

5. The user apparatus according to claim 1, comprising a communication interface for connecting to a security management server through a communication network, and wherein the processing means are also configured for:

transmitting, by means of said communication interface, a request for getting permission to control said actuator that the user wants to control, and the identity data that said user apparatus has to utilize;

receiving, through said communication interface, said at least one encryption key for communicating with said base apparatus in a secure way, in order to control said actuator.

6. The user apparatus according to claim 5, wherein the processing means are also configured for:

detecting anomalous data packets received through said communication means; and transmitting, by means of said communication interface, information on said anomalous data packets.

7. A base apparatus for controlling at least one actuator, comprising:

communication means for communicating with said user apparatus;

input/output means, which can be in communication with said at least one actuator;

memory means containing at least an encryption key;

processing means in communication with said memory means, said input/output means, and said communication means, and configured for authenticating said user apparatus according to a challenge-response authentication mechanism;

wherein the processing means are configured for:

receiving an encrypted first data packet through said communication means;

decrypting said encrypted first data packet by means of said encryption key;

authenticating said user apparatus on the basis of at least said first data packet; and activating said at least one actuator by said input/output means if the authentication succeeded;

wherein said first data packet comprises at least one identity data that identify said user apparatus and wherein said base apparatus is configured to detect said at least one identity data at different positions within said first data packet, wherein said different positions are dependent on a positioning pattern, in particular dependent on a periodic, non-periodic or random pattern;

wherein said base apparatus is configured to process at least one included data sequence with a random content and/or with a random length in said first data packet and/or that said base apparatus is configured to recognize at least one fake replica of said at least one identity data; and/or wherein the processing means are configured for authenticating said user apparatus by responding to said first data packet through a second data packet, which is encrypted through said encryption key and then emitted through said communication means, wherein said second data packet comprises at least:

a response first digest (digest_a) of said first data packet, computed by said processing means; and a second set of at least two random sequences having random content and random length, wherein said random sequences are generated excluding those that, in said emitted second data packet, produce at least one fake replica of said response first digest that said user apparatus can erroneously detect and/or wherein the processing means are configured for authenticating said user apparatus by:

generating an expected second digest on the basis of said second data packet;

receiving, through the communication means, an encrypted third data packet from the user apparatus;

decrypting said encrypted third data packet by means of said encryption key, in order to get said third data packet comprising at least a received second digest (digest_b) and a third set of at least two random sequences having random content and random length, wherein said random sequences are generated excluding those that, in said third data packet, produce at least one fake replica of said second digest (digest_b) that said base apparatus can erroneously detect;

searching for said expected second digest in said third data packet;

authenticating said user apparatus if said third data packet contains said expected second digest; and/or wherein the processing means are configured for:

generating a response third digest (digest_c) on the basis of said third data packet;

generating a fourth data packet comprising at least said response third digest (digest_c) and a fourth set of at least two random sequences having random content and random length, wherein said random sequences are generated excluding those that, in said fourth data packet, produce at least one fake replica of said response third digest (digest_c) that said user apparatus can erroneously detect; and encrypting said fourth data packet by means of said encryption key, in order to get an encrypted fourth data packet; emitting, through the communication means, the encrypted fourth data packet, so that said user apparatus can receive said encrypted fourth data packet.

8. The base apparatus according to claim 7, comprising a clock, wherein said processing means are also configured for generating, by means of said clock, a second timestamp (timestamp_b) and a fourth timestamp (timestamp_d), and wherein said second data packet also comprises said second timestamp (timestamp_b) positioned at a second fixed distance from said response first digest (digest_a) and said fourth data packet also comprises said fourth timestamp (timestamp_d) positioned at a fourth fixed distance from said response third digest (digest_c).

9. The base apparatus according to claim 8, wherein the first data packet also comprises a first timestamp (timestamp_a), and wherein the processing means are also configured for:
evaluating, by means of said clock and said processing means, the difference between the time of arrival of said first data packet and said first timestamp (timestamp_a), and stopping the emission of said second data packet if said difference falls outside a numerical interval;
and/or wherein the third data packet also comprises a third timestamp (timestamp_c), and wherein the processing means are also configured for:
evaluating, by means of said clock and said processing means, the difference between the time of arrival of said third data packet and said third timestamp (timestamp_c), and stopping the activation of said at least one actuator if said difference falls outside a numerical interval.

10. The base apparatus according to claim 7, comprising a communication interface for connecting to a security management server through a communication network, and wherein the processing means are also configured for:
receiving, through said communication interface, identity data, which identify said user apparatus, and said at least one encryption key for communicating with said user apparatus in a secure way, in order to allow the control of said actuator and/or wherein the processing means are also configured for:
detecting anomalous data packets received through the communication means; and
transmitting, through said communication interface, information on said anomalous data packets;
and/or wherein the processing means are also configured for
transmitting, through said communication interface, information on actions carried out by said actuator.

11. A base apparatus for controlling at least one actuator, comprising:
communication means for communicating with said user apparatus;
input/output means, which can be in communication with said at least one actuator;
memory means containing at least an encryption key;
processing means in communication with said memory means, said input/output means, and said communication means, and configured for authenticating said user apparatus according to a challenge-response authentication mechanism;
a clock
wherein said processing means are configured for:
receiving an encrypted first data packet through said communication means;
decrypting said encrypted first data packet by means of said encryption key;
authenticating said user apparatus on the basis of at least said first data packet; and
activating said at least one actuator by said input/output means if the authentication succeeded;
wherein said first data packet comprises at least one identity data that identify said user apparatus and wherein said base apparatus is configured to detect said at least one identity data at different positions within said first data packet, wherein said different positions are dependent on a positioning pattern, in particular dependent on a periodic, non-periodic or random pattern;
wherein said processing means are also configured for generating, by means of said clock, a second timestamp (timestamp_b) and a fourth timestamp (timestamp_d), and wherein a second data packet also comprises said second timestamp (timestamp_b) positioned at a second fixed distance from a first response first digest (digest_a) and a fourth data packet also comprises said fourth timestamp (timestamp_d) positioned at a fourth fixed distance from said response third digest (digest_c);
wherein the first data packet also comprises a first timestamp (timestamp_a), and wherein the processing means are also configured for:
evaluating, by means of said clock and said processing means, the difference between the time of arrival of said first data packet and said first timestamp (timestamp_a), and stopping the emission of said second data packet if said difference falls outside a numerical interval;
and/or wherein the third data packet also comprises a third timestamp (timestamp_c), and wherein the processing means are also configured for:
evaluating, by means of said clock and said processing means, the difference between the time of arrival of said third data packet and said third timestamp (timestamp_c), and stopping the activation of said at least one actuator if said difference falls outside a numerical interval.

* * * * *